Dec. 28, 1937.    M. KALISCHER    2,103,683

REFRIGERATION APPARATUS

Filed Nov. 3, 1934

WITNESSES:
R. J. Eisinger
J. K. Mosser

INVENTOR
MILTON KALISCHER.
BY
ATTORNEY

Patented Dec. 28, 1937

2,103,683

UNITED STATES PATENT OFFICE 2,103,683

REFRIGERATION APPARATUS

Milton Kalischer, Springfield, Mass., assignor to Westinghouse Electric & Manufacturing Company, East Pittsburgh, Pa., a corporation of Pennsylvania Application November 3, 1934, Serial No. 751,324

6 Claims. (Cl. 62—116)

My invention relates to a refrigerator, particularly one of the household type adapted to refrigerate food and to congeal liquids, and it has for an object to provide an improved refrigerator.

The present invention is a further embodiment of the invention described and claimed in the application of J. H. Ashbaugh, Serial No. 751,309, filed concurrently herewith.

It is a further object to provide such a refrigerator wherein the colder space, normally used to freeze water or congeal liquid, may be increased in size when desired for any purpose.

A preferred embodiment of my invention comprises a horizontal partition dividing the interior of the food liner into an upper space serving primarily for the preservation of food and a lower space of lower temperature serving primarily for congealing liquid. The partition is vertically adjustable, so that, when it is desired to cool an article of food to a lower temperature than usual, the partition is raised and the article placed in the lower space, in which the lower temperature is provided.

The above and other objects are effected by my invention as will be apparent from the following description and claims, taken in connection with the accompanying drawing, forming a part of this application, in which:

Figures 1, 2, 3:
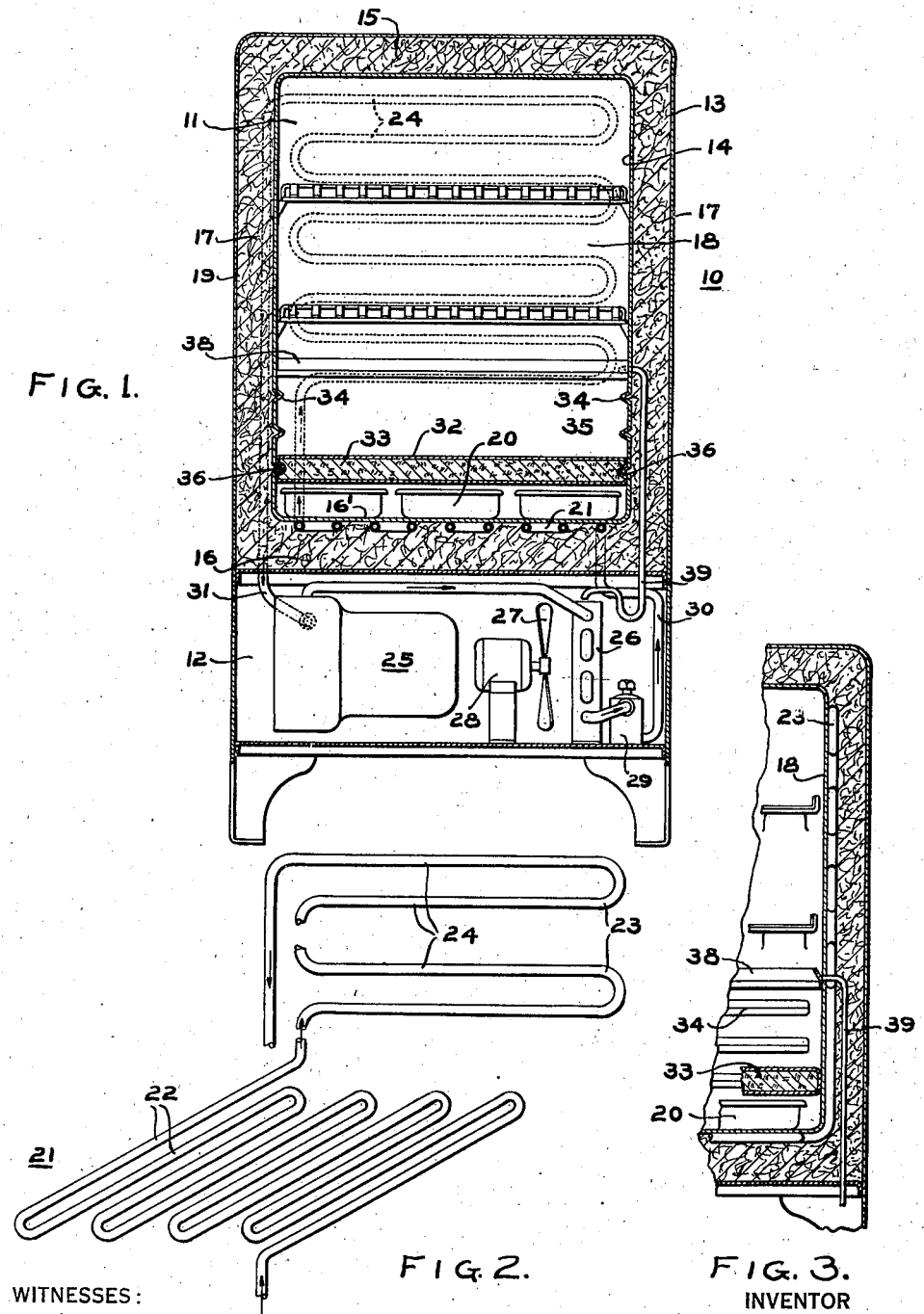
Fig. 1 is a vertical sectional view, looking from the front, of a refrigerator embodying my invention.
Fig. 2 is a diagrammatic view of the evaporators used in the refrigerator.
Fig. 3 is a fragmentary vertical sectional view taken at right angles to the section of Fig. 1.

Referring to the drawing in detail, I show a refrigerator cabinet 10 having a food compartment 11 and a machine compartment 12. The cabinet embodies an outer casing 13 and a food liner or inner casing 14 disposed therein with its wall portions in spaced relation to the respective wall portions of the outer casing to form the horizontal top and bottom walls 15 and 16, respectively, and the vertical side and rear walls 17 and 18, respectively, of the food compartment 11. Heat-insulating material 19, of any suitable kind, is preferably provided in the space between the respective wall portions of the outer casing and the food liner 14. Greater spacing and thickness of insulation is preferably provided between the bottom wall portions, due to the lower temperature at the bottom of the food compartment. The food liner is preferably of metal having a coating of porcelain enamel or other suitable material, and preferably comprises wall portions united into a unitary member.

As disclosed in the application of J. H. Ashbaugh referred to above, ice trays, i. e., trays for congealing liquid, are placed on the bottom wall portion 16' of the food liner 14, and the latter is refrigerated to a temperature sufficiently low to congeal liquid in the trays. The space within the food liner above the trays is used for storage of food, and is refrigerated to a temperature suitable for that purpose, preferably a temperature above the freezing point of water.

The bottom wall portion 16' is refrigerated to a sub-freezing temperature, sufficiently low to congeal liquid in the trays 20 at a sufficiently rapid rate, by an evaporator 21. The latter may be, as shown, a serpentine coil secured to the lower surface of the bottom wall portion of the wall 16' in any suitable manner, as by soldering so as to effect good heat transfer therebetween. Preferably, each turn 22 of the coil 21 extends the full depth of the bottom wall portion 16', and a sufficient number of turns 22 are provided to extend across the entire width thereof. In accordance with my invention, I provide the rear wall portion 18 of the food liner with an evaporator 23 for cooling the interior of the food liner above the trays to a low temperature above the freezing point of water. The evaporator 23 may likewise comprise a serpentine coil, including horizontal turns or tubes 24 extending substantially across the width of the food liner.

The evaporators 21 and 23 may be operated in any suitable manner to effect the respective temperatures described above. For the purpose of illustration, the evaporators are shown as connected in series, the refrigerant flowing first through the evaporator 21 and then through the evaporator 23.

One suitable form of mechanism whereby the desired temperatures of the evaporators are obtained is disclosed and claimed in the application of Leslie M. Buchanan, Serial No. 15,003, filed April 6, 1935. Inasmuch as the detail construction of such mechanism is not a part of the present invention, it is not further described herein.

A suitable refrigerating unit for supplying liquid refrigerant and withdrawing vaporous refrigerant is located in the machine compartment 12. It includes a motor compressor unit 25, a condenser 26, a fan 27 driven by a motor 28 for circulating air over the condenser, and a float valve 29. The refrigerating mechanism operates in the usual manner, compressed refrigerant being conveyed from the motor compressor 25 to the condenser 26 in which it is condensed, and then conveyed through the float valve 29 and a conduit 30 to the evaporator 21. From the latter it flows through the evaporator 24 and is then returned through a conduit 31 to the motor compressor 25 to be recirculated.

In accordance with my invention, I provide a horizontal partition 32 above the trays 20 for dividing the interior of the food liner into a lower space in which the trays are maintained at freezing temperature and an upper space in which the food is stored. The partition 32 preferably includes heat insulating material 33 for minimizing heat transfer from the warmer upper space to the lower colder space. The partition 32 may be supported in any suitable manner, but it is a feature of my invention to support the partition in an adjustable manner, so that the vertical position thereof may be varied. One suitable form of such supporting means comprises horizontal ribs or flanges 34, 35, and 36 on the side wall portions of the food liner 14. The partition 32 is formed with grooves 36 in the opposite side edges which engage with said ribs so as to support the partition in the food liner. Preferably, an accurate fit is provided in order to seal against air flow between the upper and lower spaces.

Normally, the partition 32 will rest on the lowermost ribs 36, in which position it is just above the trays 20. In this position of the partition, the trays 20 may be used for freezing water or for congealing any other liquid within said trays. It is also possible to remove one or more of the ice trays and to place an article of food or other article on the bottom wall portion 16', when it may be desired to cool such article to a low temperature or to provide more rapid cooling thereof. When it is desired to place a larger article or vessel in the lower space for the purpose of providing a lower temperature or more rapid cooling thereof, the partition 32 is raised by sliding the same forwardly and then onto one of the higher ribs as required, so as to provide a greater space below the partition 32 in which the colder temperature is maintained. For example, assuming that the user of the refrigerator has just purchased a watermelon and is desirous of quickly chilling the same, he may place the partition in the uppermost position, on the ribs 34, and remove a sufficient number of the trays 20. Ample space is then provided for placing the watermelon in the lower colder space.

Due to the fact that the space below the ribs 34 may be used at times as a part of the lower cold space, the warmer evaporator 23 preferably extends only between the top of the rear wall portion 18 and said ribs 34. Inasmuch as the air within the upper space is cooled by contact with the rear wall portion 18, moisture will be condensed thereon and flow downwardly by gravity. Accordingly, I provide a trough 38 adjacent the lowermost turn of the coil 23 and the rib 34 for collecting said moisture. The moisture is drained from the trough 38 in any suitable manner, as by a drain pipe 39, which may discharge the same onto the surfaces of the condenser 26. On the latter, the moisture is readily condensed by the current of air circulated by the fan 27.

From the above description, it will be seen that I have provided a simple and practical construction for providing separate spaces of two temperatures within a refrigerator cabinet. The provision of a separate evaporator operating at higher temperature for refrigerating the food storage space provides a higher humidity of the air therein thereby maintaining the food in better condition.

While I have shown my invention in but one form, it will be obvious to those skilled in the art that it is not so limited, but is susceptible of various changes and modifications without departing from the spirit thereof, and I desire, therefore, that only such limitations are placed thereupon as are imposed by the prior art or as are specifically set forth in the appended claims.

What I claim is:

1. In refrigerating apparatus, the combination of a refrigerator cabinet embodying a food liner, the food liner having a plurality of wall portions including a bottom wall portion, a tray for congealing liquid supported on said bottom wall portion, a partition of relatively low heat conductivity disposed above said tray to divide the interior of the food liner into an upper space and a lower space, said partition being vertically adjustable to increase said lower space when desired, said bottom wall portion having an evaporator adapted to provide a sub-freezing temperature for congealing liquid in said tray, and one of the other wall portions having an evaporator for cooling said upper space to a sufficiently low temperature for preservation of food.

2. Refrigerating apparatus as defined in claim 1, wherein said partition carries heat-insulating material to provide heat insulation between the upper and lower spaces.

3. In a refrigerator, the combination of a cabinet embodying a food liner therein, a heat insulated partition for dividing the interior of the food liner into a first space serving primarily for the storage of food and a second space serving primarily for congealing liquids, means for supporting said partition in varying positions in the compartment to vary the size of the second space, an evaporator arranged in heat conducting contact with a portion of the food liner that is always adjacent the first space for maintaining therein a temperature sufficiently low for preservation of food but above freezing and a second evaporator arranged in heat conducting contact with a portion of the liner always adjacent the second space for maintaining therein a sub-freezing temperature.

4. A refrigerator cabinet comprising a liner having top, bottom and vertical wall portions, said bottom wall portion having an evaporator adapted to cool the same to a temperature sufficiently low to congeal liquid in a tray resting on the bottom wall portion, a horizontal heat-insulated partition for dividing the interior of the food liner into a freezing space adjacent the bottom of the liner and a relatively higher temperature refrigerated space adjacent the top of the liner, means for supporting said partition at any one of a plurality of positions for varying the sizes of said spaces, the partition in at least two of said positions providing a freezing space smaller than said higher temperature space, and a second evaporator disposed above the partition when in the uppermost of said two positions for cooling said higher temperature refrigerated space to a temperature above freezing but sufficiently low for preservation of food.

5. A refrigerator cabinet comprising a liner having top, bottom and vertical wall portions, a horizontal heat insulated partition for dividing the interior of the food liner into a first space adjacent the bottom of the liner and a second space adjacent the top of the liner, means for supporting said partition at any one of a plurality of positions for varying the sizes of said spaces, a first evaporator disposed below said partition when in the lowermost of said positions for cooling said first space, and a second evaporator disposed above said partition when in the uppermost of said positions for cooling said second space, one of said evaporators being adapted to cool the associated space to a temperature sufficiently low for freezing water and the other evaporator being adapted to cool the associated space to a temperature above freezing but sufficiently low for preservation of food.

6. A refrigerator cabinet comprising a liner having top, bottom and vertical wall portions, a horizontal heat-insulated partition for dividing the interior of the food liner into a freezing space adjacent the bottom of the liner and a relatively higher temperature refrigerated space adjacent the top of the liner, means for supporting said partition at any one of a plurality of positions for varying the size of said spaces, the partition in at least two of said positions providing a freezing space smaller than said higher temperature space, a first evaporator disposed below said partition when in the lowermost of said positions for cooling said freezing space to a temperature sufficiently low to freeze water, and a second evaporator disposed above said partition when in the uppermost of said positions for cooling said higher temperature refrigerated space to a temperature above freezing but sufficiently low for preservation of food.

MILTON KALISCHER.